United States Patent
Cha et al.

(10) Patent No.: US 10,843,263 B2
(45) Date of Patent: Nov. 24, 2020

(54) COMPOSITION CONTAINING METAL POWDER FOR THREE-DIMENSIONAL PRINTING, THREE-DIMENSIONAL PRINTING METHOD USING SAME AS RAW MATERIAL, AND THREE-DIMENSIONAL PRINTING DEVICE

(71) Applicants: 3D Controls Inc., Suwon (KR); Ki Ryong Cha, Gumi (KR)

(72) Inventors: Ki Ryong Cha, Gumi (KR); Sang Kyu Lee, Suwon (KR)

(73) Assignee: 3D CONTROLS INC., Suwon (KR)

(*) Notice: Subject to any disclaimer, the term of this patent is extended or adjusted under 35 U.S.C. 154(b) by 316 days.

(21) Appl. No.: 15/765,311

(22) PCT Filed: Aug. 2, 2016

(86) PCT No.: PCT/KR2016/008478
§ 371 (c)(1),
(2) Date: Apr. 2, 2018

(87) PCT Pub. No.: WO2017/057838
PCT Pub. Date: Apr. 6, 2017

(65) Prior Publication Data
US 2018/0281062 A1 Oct. 4, 2018

(30) Foreign Application Priority Data
Oct. 2, 2015 (KR) .......................... 10-2015-0139141

(51) Int. Cl.
*B22F 3/00* (2006.01)
*B33Y 10/00* (2015.01)
(Continued)

(52) U.S. Cl.
CPC ............ *B22F 3/008* (2013.01); *B22F 1/0062* (2013.01); *B33Y 10/00* (2014.12); *B33Y 30/00* (2014.12);
(Continued)

(58) Field of Classification Search
CPC .. B22F 2999/00; B22F 3/008; B22F 2203/03; B22F 2203/11; B22F 3/003;
(Continued)

(56) References Cited

U.S. PATENT DOCUMENTS

2013/0218281 A1* 8/2013 Broadley .............. A61F 2/4455
623/18.11
2015/0125334 A1 5/2015 Uetani et al.
(Continued)

FOREIGN PATENT DOCUMENTS

CN 103769587 A * 5/2014
CN 104552943 A * 4/2015
(Continued)

*Primary Examiner* — Jenny R Wu
(74) *Attorney, Agent, or Firm* — John H. Choi & Associates

(57) ABSTRACT

The present invention relates to a composition containing a metal powder for three-dimensional printing, a three-dimensional printing method using the same as a raw material, and a three-dimensional printing device, which enable a metal product, which requires high precision as well as high strength, to be produced by a three-dimensional printing technique using a raw material containing a metal powder as a feedstock for three-dimensional printing. In particular, the composition containing a metal powder for three-dimensional printing, according to the present invention, is used as a feedstock supplied to an extrusion head of a three-dimensional printer, and is produced by kneading, pulverizing, and pelletizing the metal powder and a polymer binder.

10 Claims, 10 Drawing Sheets

(51) Int. Cl.
  *B33Y 30/00*    (2015.01)
  *B33Y 70/00*    (2020.01)
  *C22C 38/44*    (2006.01)
  *C22C 38/04*    (2006.01)
  *C22C 38/02*    (2006.01)
  *C22C 38/00*    (2006.01)
  *B22F 1/00*     (2006.01)
  *B22F 3/15*     (2006.01)
  *C22C 33/02*    (2006.01)
  *B29C 64/209*   (2017.01)
  *B22F 3/10*     (2006.01)
  *B29C 64/227*   (2017.01)

(52) U.S. Cl.
  CPC .......... *B33Y 70/00* (2014.12); *C22C 33/0285* (2013.01); *C22C 38/002* (2013.01); *C22C 38/02* (2013.01); *C22C 38/04* (2013.01); *C22C 38/44* (2013.01); *B22F 1/0014* (2013.01); *B22F 1/0059* (2013.01); *B22F 3/1021* (2013.01); *B22F 3/15* (2013.01); *B22F 2301/35* (2013.01); *B22F 2999/00* (2013.01); *B29C 64/209* (2017.08); *B29C 64/227* (2017.08)

(58) Field of Classification Search
  CPC .... B22F 1/0014; B22F 1/0059; B22F 1/0062; B22F 2301/35; B22F 3/1021; B22F 3/15; B29C 64/209; B29C 64/227; B33Y 10/00; B33Y 30/00; B33Y 70/00; C22C 33/0285; C22C 38/002; C22C 38/02; C22C 38/04; C22C 38/44
  See application file for complete search history.

(56) References Cited

U.S. PATENT DOCUMENTS

2016/0325356 A1\*  11/2016  Hirata ................... B28B 1/001
2020/0078859 A1\*   3/2020  Cho ..................... B22F 3/1055

FOREIGN PATENT DOCUMENTS

| | | | |
|---|---|---|---|
| CN | 104723558 A | | 6/2015 |
| CN | 204367423 U | \* | 6/2015 |
| CN | 104760282 A | | 7/2015 |
| CN | 204658966 U | | 9/2015 |
| JP | 04-337006 A | | 11/1992 |
| JP | 07-242903 A | | 9/1995 |
| JP | 2000144205 A | | 5/2000 |
| JP | 2003-077202 A | | 3/2003 |
| KR | 10-20110043073 | | 4/2011 |
| KR | 10-1502342 B1 | | 3/2015 |
| KR | 101502342 B1 | \* | 3/2015 |
| KR | 10-2015-0098142 | | 8/2015 |

\* cited by examiner

COMPOSITION CONTAINING METAL POWDER FOR THREE-DIMENSIONAL PRINTING, THREE-DIMENSIONAL PRINTING METHOD USING SAME AS RAW MATERIAL, AND THREE-DIMENSIONAL PRINTING DEVICE

CROSS-REFERENCE TO RELATED APPLICATION

This application claims priority to and the benefit of PCT Application No. PCT/KR2016/008478, filed on Aug. 2, 2016, which claims priority to and the benefit of Korean Patent Application No. 10-2015-0139141 filed in the Korean Intellectual Property Office on Oct. 2, 2015, the entire contents of each of which is incorporated by reference in its entirety.

FIELD

The present invention relates to a composition containing a metal powder for three-dimensional printing, a three-dimensional printing method using the same as a raw material, and a three-dimensional printing device, and more specifically, to a composition containing a metal powder for three-dimensional printing, a three-dimensional printing method using the same as a raw material, and a three-dimensional printing device, which enable a metal product, which requires high precision as well as high strength, to be produced by a three-dimensional printing technique using a composition containing a metal powder. The present invention claims priority to and the benefit of Korean Patent Application No. 10-2015-0139141 filed in the Korean Intellectual Property Office on Oct. 2, 2015, the entire contents of which are incorporated herein by reference.

BACKGROUND

A three-dimensional (3D) printer is equipment which uses three-dimensional data of a target to be printed and three-dimensionally molds a shaped product such that the shaped product has a shape which is the same as or similar to the target. The use of the three-dimensional printing has spread in various fields. The three-dimensional printer has been used for modeling or a sample manufacture prior to mass production in the past, but recently, as a technical foundation in which the three-dimensional printer can be used even for molding a product based on the small quantity batch production and capable of being mass produced, has been created, many manufacturers have used the three-dimensional printer for making various kinds of models such as a medical human body model or a home appliance such as a toothbrush or a shaver in addition to the automobile field composed of many parts.

Methods of molding a product by a three-dimensional printer are largely classified into a so-called addition type method of making a form by molding a target object into a two-dimensional planar form and melt-attaching the molded object, while three-dimensionally stacking the molded object, and a cutting type method of making a form by cutting a material lump like carving the lump. Moreover, as a kind of addition type, there is a filament melt stack molding method which molds a product having a three-dimensional shape of a target to be printed by supplying a wire or a filament made of a thermoplastic plastic through a feed reel or a transfer roll, melting the supplied filament in a nozzle of an extrusion head mounted on a three-dimensional transfer apparatus of which the position is relatively adjusted in three XYZ directions with respect to a workbench, and then discharging the filament to repeatedly stack a 2-dimensional planar form (print layer) on a plate.

Currently, a most commonly used material for three-dimensional printing is a photocurable polymer material 'photopolymer' which is hardened when irradiated with light. The photopolymer accounts for 56% of the whole market share. A material, which is popular second to the photopolymer, is thermoplastic plastic in a solid form, which is freely molten and hardened, accounting for 40% of the market share. As a form of the thermoplastic plastic material, a filament form has been usually used, and as an existing filament material, polylactic acid (PLA), acrylonitrile butadiene styrene (ABS), high density polyethylene (HDPE), polycarbonate (PC), and the like have been used.

However, the plastic materials described above have a limitation in that the plastic materials have low hardness and thus are not suitable for molding a steel product such as a metal part requiring high strength and high precision.

The prior art includes Korean Patent Application Laid-Open No. 10-2015-0025865 (Published date: Mar. 11, 2015, Title of the Invention: METAL-RESIN COMPOSITION FOR 3D PRINTER).

SUMMARY

An object of the present invention is to provide a composition containing a metal powder which is used as a feedstock of a three-dimensional printer, a three-dimensional printing method using the same as a raw material, and a three-dimensional printing device, which enable molding a metal product having excellent mechanical properties and requiring high precision by performing a three-dimensional printing using a raw material containing a metal powder.

Further, an object of the present invention is to provide a composition containing a metal powder, which enables securing mechanical properties of a metal product molded by three-dimensional printing.

In addition, an object of the present invention is to provide a three-dimensional printing method and a three-dimensional printing device, which enable molding a metal product having excellent mechanical properties and requiring high precision by performing three-dimensional printing using a raw material containing a metal powder.

In order to achieve the aforementioned object, a composition containing a metal powder for three-dimensional printing according to the present invention is a composition containing a metal powder used as a feedstock supplied to a printing head of a three-dimensional printer, in which a metal powder and a polymer binder are kneaded, pulverized, and pelletized.

In this case, the metal powder may correspond to an austenitic stainless steel metal powder having a steel composition of SUS-304L or SUS-316L.

In this case, the metal powder may be an austenitic stainless steel metal powder composed of C: 0.03 wt % or less, Si: 1.0 wt % or less, Mn: 1.0 wt % or less, Cr: 18 to 20 wt %, Ni: 10 to 12 wt %, Mo: 0.2 wt % or less, P: 0.03 wt % or less, S: 0.03 wt % or less, the balance Fe, and other inevitable impurities.

In this case, the metal powder may be an austenitic stainless steel metal powder composed of C: 0.03 wt % or less, Si: 1.0 wt % or less, Mn: 1.5 wt % or less, Cr: 16 to 18 wt %, Ni: 11 to 14 wt %, Mo: 2 to 3 wt %, P: 0.03 wt % or less, S: 0.03 wt % or less, the balance Fe, and other inevitable impurities.

In this case, the polymer binder may include a binding agent, a plasticizer, and a lubricant.

In this case, the composition containing a metal powder for three-dimensional printing according to the present invention may include 90.0 to 94.0 wt % of the metal powder, 3.0 to 5.0 wt % of the binding agent, 2.5 to 3.5 wt % of the plasticizer, and 0.5 to 1.5 wt % of the lubricant.

In this case, the binding agent may correspond to a polyethylene copolymer.

In this case, the plasticizer may correspond to paraffin wax.

In this case, the lubricant may correspond to stearic acid.

In this case, the composition containing a metal powder for three-dimensional printing according to the present invention may be produced by kneading the metal powder and the polymer binder at a temperature of 170° C. or more and pelletizing the kneaded product into a pellet having a predetermined particle size by a pelletizer.

Further, in order to achieve the aforementioned objects, a three-dimensional printing method using a composition containing a metal powder as a raw material according to the present invention is characterized by including: a raw material preparing step of preparing a composition containing a metal powder by kneading, pulverizing, and pelletizing a metal powder and a polymer binder; a raw material supplying step of supplying the composition containing a metal powder to an extrusion head of a three-dimensional printer; a stacking step of stacking a print layer on a plate by discharging the molten composition containing a metal powder onto a surface of the plate through a nozzle of the extrusion head; a molding step of molding a semi-finished product by repeatedly performing the stacking step to continuously stack the print layer in a three-dimensional shape of a target to be printed; a degreasing step of removing the polymer binder from the molded semi-finished product in the molding step; and a sintering step of sintering and cooling the semi-finished product from which the polymer binder is removed in the degreasing step to extract a final steel product having the three-dimensional shape of the target to be printed.

In this case, in the raw material preparing step, a composition containing a metal powder may be prepared by kneading the metal powder and the polymer binder and pelletizing the kneaded product into a pellet having a predetermined particle size.

In this case, the metal powder may correspond to an austenitic stainless steel metal powder having a steel composition of SUS-304L or SUS-316L.

In this case, the metal powder may correspond to an austenitic stainless steel metal powder composed of C: 0.03 wt % or less, Si: 1.0 wt % or less, Mn: 1.0 wt % or less, Cr: 18 to 20 wt %, Ni: 10 to 12 wt %, Mo: 0.2 wt % or less, P: 0.03 wt % or less, S: 0.03 wt % or less, the balance Fe, and other inevitable impurities.

In this case, the metal powder may correspond to an austenitic stainless steel metal powder composed of C: 0.03 wt % or less, Si: 1.0 wt % or less, Mn: 1.5 wt % or less, Cr: 16 to 18 wt %, Ni: 11 to 14 wt %, Mo: 2 to 3 wt %, P: 0.03 wt % or less, S: 0.03 wt % or less, the balance Fe, and other inevitable impurities.

In this case, in the raw material preparing step, the composition containing a metal powder may be prepared by kneading, pulverizing, and pelletizing 90.0 to 94.0 wt % of the metal powder, 3.0 to 5.0 wt % of the binding agent, 2.5 to 3.5 wt % of the plasticizer, and 0.5 to 1.5 wt % of the lubricant.

In this case, the binding agent may correspond to a polyethylene copolymer, the plasticizer may correspond to paraffin wax, and the lubricant may correspond to stearic acid.

In this case, in the raw material preparing step, the metal powder and the polymer binder may be kneaded at a temperature of 170° C. or more.

In this case, in the raw material supplying step, the composition containing a metal powder may be supplied to the extrusion head of the three-dimensional printer by melting a pellet into which the composition containing a metal powder is pelletized, and then pressing and injecting the pellet.

In this case, in the raw material supplying step, the pellet into which the metal power-containing composition is pelletized may be supplied to the extrusion head of the three-dimensional printer, and may be molten by heat generated from the extrusion head.

In this case, the degreasing step may include: a solvent degreasing step of removing the plasticizer and the lubricant from the polymer binder by immersing the semi-finished product into a solvent; and a hot degreasing step of removing the binding agent from the polymer binder by heating the semi-finished product in the solvent degreasing step.

In this case, in the solvent degreasing step, the plasticizer and the lubricant may be removed by immersing the semi-finished product into a tetrahydrofuran or heptane solvent at 25 to 35° C. for 24 hours or more.

In this case, in the hot degreasing step, the binding agent may be removed by heating the semi-finished product while stepwisely increasing the temperature to 500° C. in a nitrogen ($N_2$) atmosphere.

In this case, the sintering step may include: a general sintering step of heating the semi-finished product while stepwisely increasing the temperature to 1,000° C. in a vacuum atmosphere; a hot isostatic press sintering step of heating the semi-finished product by stepwisely increasing the temperature to 1,350° C. in an argon (Ar) atmosphere of 1,000 to 1,200 bar, and then maintaining the temperature at 1,350° C. for 1 to 3 hours; and a cooling step of cooling the semi-finished product to room temperature to extract a final steel product.

In this case, the three-dimensional printing method using the composition containing a metal powder according to the present invention as a raw material may further include, prior to the sintering step, a temporary sintering step of heating the semi-finished product, from which the polymer binder is removed in the degreasing step, while stepwisely increasing the temperature to 900° C. in a vacuum atmosphere.

In addition, in order to achieve the aforementioned objects, a three-dimensional printing device using the composition containing a metal powder according to an exemplary embodiment of the present invention as a raw material is characterized by including: a raw material supplying unit which is supplied with a composition containing a metal powder from the outside and injects the supplied composition containing a metal powder; a first transfer pipe unit which transfers the composition containing a metal powder injected from the raw material supplying unit; a three-dimensional printing unit which molds a semi-finished product by discharging the composition containing a metal powder supplied from the first transfer pipe to continuously stack a print layer in a three-dimensional shape of a target to be printed; a degreasing unit which removes a binder from the semi-finished product molded by the three-dimensional printing unit; and a sintering unit which sinters the semi-finished product molded by the three-dimensional printing unit.

In this case, the raw material supplying unit may include: a hopper part which is supplied with a composition containing a metal powder from the outside; a barrel part which is provided with a transfer passage connected to the hopper part; an injection means which is positioned inside the barrel part and injects the composition containing a metal powder inside the barrel part; a heating part which heats the composition containing a metal powder inside the barrel part; and a die part which connects the barrel part to the first transfer pipe.

In this case, the first transfer pipe unit may be equipped with a heating coil part which heats a material moving inside the first transfer pipe unit.

In this case, the three-dimensional printing unit may include: a first axis guide, a second axis guide, and a third axis guide; a plurality of carriages which is capable of moving along an axis in the first axis guide, the second axis guide, and the third axis guide; a plurality of support axes which is connected to the carriages; a moving part which is connected to the plurality of support axes; an extrusion head which is fixed to the moving part to extrude the supplied composition containing a metal powder; and a nozzle which discharges the extruded composition containing a metal powder.

In this case, the three-dimensional printing unit may include: a first axis guide, a second axis guide, and a third axis guide; a plurality of belts which is fixed to each of the first axis guide, the second axis guide, and the third axis guide and in parallel with the first axis guide, the second axis guide, and the third axis guide; a plurality of carriage parts which is capable of moving along the plurality of belts; a plurality of support axes which is connected to the carriages; a moving part which is connected to the plurality of support axes; an extrusion head which is fixed to the moving part to extrude the supplied composition containing a metal powder; and a nozzle which discharges the extruded composition containing a metal powder.

In this case, the support axis may make a hinge movement with respect to the carriage, and the support axis may make a hinge movement with respect to the moving part.

In this case, the degreasing unit may include a solvent degreasing unit which extracts a binder from the semi-finished product.

In this case, the hot degreasing unit may include: a chamber part; a vacuum apparatus which decreases pressure in the chamber part; an atmosphere gas charging device which charges an atmosphere gas inside the chamber part; and a temperature adjusting part which adjusts the temperature of the chamber part.

In this case, the sintering unit may include: a sintering chamber part; a sintering vacuum apparatus which decreases pressure in the sintering chamber part; a sintering atmosphere gas charging device which charges an atmosphere gas inside the sintering chamber part; and a sintering temperature adjusting part which adjusts a temperature of the sintering chamber part.

In this case, the raw material supplying unit may supply the raw material supplying unit with the composition containing a metal powder in the form of a pellet in which a metal powder and a binder are kneaded, and the binder may include a binding agent, a plasticizer, a lubricant, and a surfactant.

Furthermore, in order to achieve the aforementioned objects, a three-dimensional printing device using a composition containing a metal powder according to another exemplary embodiment of the present invention as a raw material is characterized by including: a base plate; a moving part which is movably mounted at an upper portion of the base plate; an extrusion head which is mounted at one side of the moving part and molds a semi-finished product by discharging a composition containing a metal powder including a metal powder and a binder onto the base plate to continuously stack a print layer in a three-dimensional shape of a target to be printed; a raw material supplying unit which supplies the composition containing a metal powder to the extrusion head; a degreasing unit which removes the binder from the semi-finished product; and a sintering unit which sinters the semi-finished product from which the binder is removed to extract a finished product having the three-dimensional shape of a target to be printed.

In this case, the raw material supplying unit may supply the extrusion head with the composition containing a metal powder in the form of a filament.

In this case, the raw material supplying unit may include: a heating part which heats the composition containing a metal powder introduced from the outside to melt the composition containing a metal powder; a piston part which presses the composition containing a metal powder molten by the heating part to inject the composition containing a metal powder; a pressing part which transfers pressure to the piston part; and a guide part which continuously supplies the extrusion head with the composition containing a metal powder discharged from the heating part in the form of a filament.

In this case, the pressing part may transfer air pressure to the piston part.

In this case, the raw material supplying unit may supply the extrusion head with the composition containing a metal powder in the form of a pellet in which the metal powder and the binder are kneaded.

In this case, the binder may include a binding agent, a plasticizer, a lubricant, and a surfactant.

In this case, the raw material may also be a composition containing a metal powder produced by kneading the metal powder and the polymer binder and pelletizing the kneaded product into a pellet having a predetermined particle size.

In this case, the metal powder may correspond to an austenitic stainless steel metal powder having a steel composition of SUS-304L or SUS-316L.

In this case, the metal powder may correspond to an austenitic stainless steel metal powder composed of C: 0.03 wt % or less, Si: 1.0 wt % or less, Mn: 1.5 wt % or less, Cr: 18 to 20 wt %, Ni: 10 to 12 wt %, Mo: 0.2 wt % or less, P: 0.03 wt % or less, S: 0.03 wt % or less, the balance Fe, and other inevitable impurities.

In this case, the metal powder may correspond to an austenitic stainless steel metal powder composed of C: 0.03 wt % or less, Si: 1.0 wt % or less, Mn: 1.5 wt % or less, Cr: 16 to 18 wt %, Ni: 11 to 14 wt %, Mo: 2 to 3 wt %, P: 0.03 wt % or less, S: 0.03 wt % or less, the balance Fe, and other inevitable impurities.

In this case, in the raw material preparing step, the composition containing a metal powder may be prepared by kneading, pulverizing, and pelletizing 90.0 to 94.0 wt % of the metal powder, 3.0 to 5.0 wt % of the binding agent, 2.5 to 3.5 wt % of the plasticizer, and 0.5 to 1.5 wt % of the lubricant.

In this case, the binding agent may correspond to a polyethylene copolymer, the plasticizer may correspond to paraffin wax, and the lubricant may correspond to stearic acid.

According to the present invention, there is an effect in that it is possible to mold a metal product having excellent mechanical properties and requiring high precision by performing three-dimensional printing using a raw material containing a metal powder.

Further, according to the present invention, there is an effect in that it is possible to provide a raw material containing a metal powder, which enables securing mechanical properties of a metal product molded by three-dimensional printing, a three-dimensional printing method using the same, and a three-dimensional printing device.

DETAILED DESCRIPTION

Figure 1:
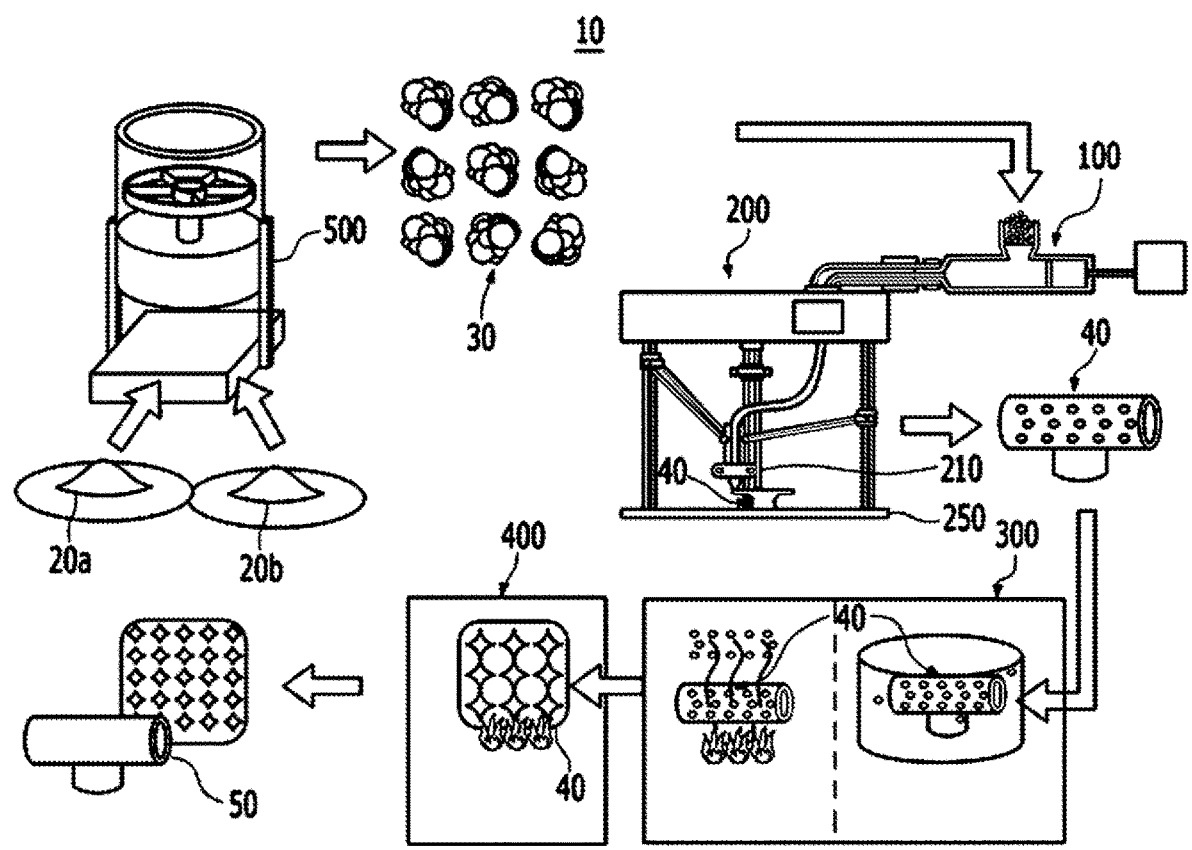
FIG. 1 is a view for explaining a concept of performing three-dimensional printing using a composition containing a metal powder according to the present invention.

A preferred embodiment of the present invention will be described in detail as follows with reference to the accompanying drawings. Prior to the detailed description of the present invention, the terms or words used in the present specification and claims to be explained below should not be interpreted as being limited to typical or dictionary meanings. Accordingly, since the exemplary embodiments described in the present specification and the configurations illustrated in the drawings are only a preferred embodiment of the present invention and do not represent all of the technical spirit of the present invention, it is to be understood that various equivalents and modified examples, which may replace the these exemplary embodiments and configurations, are possible at the time of filing the present application.

FIG. 1 is a view for explaining a concept of performing three-dimensional printing using a composition containing a metal powder 30 and a three-dimensional printing apparatus 10 according to the present invention. Referring to FIG. 1, the composition containing a metal powder 30 according to the present invention is produced by homogeneously kneading a metal powder 20a and a polymer binder 20b at high temperature through a kneading machine 500, and pulverizing and pelletizing the kneaded product into a pellet having a predetermined particle size using a grinder or a pelletizer. The composition containing a metal powder 30 thus produced is stacked by a three-dimensional printing method in the three-dimensional printing device 10, and is supplied to an extrusion head 210 of a three-dimensional printing unit 200 as a feedstock used to produce a steel product. Here, it is preferred that so as to be smoothly supplied to the extrusion head 210 of a three-dimensional printing unit 200, the composition containing a metal powder 30 is molten and pressure-injected by a raw material supplying unit 100, and thus is supplied to the extrusion head 210. The composition containing a metal powder 30 supplied to the extrusion head 210 is discharged onto a surface of a base plate 250 in a manner similar to a hot-melt adhesive gun, and a print layer is continuously stacked in a three-dimensional shape of a target to be printed, thereby forming a semi-finished product 40. A process, in which polymer binder components are removed from the semi-finished product 40 thus molded by a solvent and a hot degreasing methods by a degreasing unit 300, and the resulting product is sintered at high temperature by a sintering unit 400, and then cooled to room temperature, and a final steel product 50, which is a high-density metal sintered body, is extracted, is carried out.

In order to mold a high-strength steel product by a three-dimensional printing method, the present invention suggests a composition in which a metal powder is agglomerated with a polymer binder as a raw material for three-dimensional printing as described above. In particular, in order to produce the composition, the present invention uses a metal powder in which austenitic stainless steel having a steel composition of SUS-304L or SUS-316L is pulverized as the metal powder.

The austenitic stainless steel is called as a nickname Cr—Ni-based stainless steel, and is stainless steel in which Cr and Ni are added to Fe. The main components of the austenitic stainless steel are Fe, Cr, and Ni, and the austenitic stainless steel includes various additives shown in the following Table 1 in addition to the components.

The following Table 1 shows a preferred example of the austenitic stainless steel which is a component of the metal powder used to produce the composition containing a metal powder for three-dimensional printing in the present invention, and the exemplary embodiment of the present invention is not limited only to this example.

TABLE 1

| | Component | | | | | | | | |
|---|---|---|---|---|---|---|---|---|---|
| | C | Si | Mn | Cr | Ni | Mo | P | S | Others |
| Composition 1 (mass %) | 0.03 or less | 1.0 or less | 1.0 or less | 18~20 | 10~12 | 0.2 or less | 0.03 or less | 0.03 or less | the balance Fe and other inevitable impurities |
| Composition 2 (mass %) | 0.03 or less | 1.0 or less | 1.5 or less | 16~18 | 11~14 | 2~3 | 0.03 or less | 0.03 or less | the balance Fe and other inevitable impurities |

Since carbon (C) reacts with chromium (Cr) added to improve corrosion resistance to precipitate chromium carbide in the grain boundary, carbon (C) may cause a deterioration in corrosion resistance in some cases. Accordingly, it is preferred that the content of carbon (C) is small, and when the content of carbon (C) is 0.03 wt % or less, there is no case where corrosion resistance significantly deteriorates. Therefore, it is preferred that the content of carbon (C) is 0.03 wt % or less.

Silicon (Si): 1.0 wt % or less

Silicon (Si) is an element effective for deacidification, and is added in a solvent step. However, when silicon (Si) is contained in excess, a steel product extracted after degreasing and sintering causes hardening of the stainless steel sheet to decrease ductility in some cases, so that it is preferred that the content of silicon (Si) is 1.0 wt % or less.

Manganese (Mn): 1.5 wt % or less

Manganese (Mn) is an element which has an effect of decreasing sulfur (S) solid-solubilized in stainless steel by being bonded to sulfur (S) inevitably incorporated, and is effective for preventing cracking of the steel product extracted after degreasing and sintering (preventing cracking of the steel sheet during hot rolling) by suppressing segregation of sulfur at the grain boundary. However, even though the element is added in an amount of more than 1.5 wt %, there is little increase in effect of adding the element. Rather, an increase in costs is caused by adding the element in excess. Therefore, it is preferred that the content of manganese (Mn) is 1.5 wt % or less.

Nickel (Ni): 10 to 14 wt %

Nickel (Ni) is an element which stabilizes an austenite phase, and is added when austenitic stainless steel is produced. In this case, when the content of nickel (Ni) is more than 14 wt %, an increase in costs is caused by excessively consuming nickel (Ni). Therefore, it is preferred that the content of nickel (Ni) is 14 wt % or less.

Molybdenum (Mo): 3 wt % or less

Molybdenum (Mo) is an element effective for suppressing a local corrosion of stainless steel such as crevice corrosion. Accordingly, when a steel product is used under a harsh environment, it is effective to add molybdenum (Mo). However, when the element is added in an amount of more than 3 wt %, stainless steel becomes embrittled, and as a result, productivity is reduced in some cases, and an increase in costs is caused by excessively consuming molybdenum (Mo). Therefore, it is preferred that the content of molybdenum (Mo) is 3 wt % or less.

Phosphorus (P): 0.03 wt % or less

Since phosphorus (P) causes a deterioration in ductility, it is preferred that the content of the element is small, but when the content thereof is 0.03 wt % or less, there is no case where ductility significantly deteriorates. Therefore, it is preferred that the content of phosphorus (P) is 0.03 wt % or less.

Sulfur (S): 0.03 wt % or less

Sulfur (S) is an element which causes a deterioration in corrosion resistance by being bonded to manganese (Mn) to form manganese sulfide (MnS), and it is preferred that the content of the element is small. When the content thereof is 0.03 wt % or less, there is no case where corrosion resistance significantly deteriorates. Therefore, it is preferred that the content of sulfur (S) is 0.03 wt % or less.

The balance is Fe and other inevitable impurities.

In the present invention, it is preferred to use a metal powder having a size, which is a particle diameter (D50) of 9.5 to 11 μm, as the austenitic stainless steel metal powder having the component and the content ratio of Composition 1 or Composition 2 in Table 1. Further, in order to increase density of a steel product which is a finally completed product, decrease the content of a polymer binder due to the small surface area of the powder, smoothly carry out degreasing, and maintain a uniform shrinkage during the sintering, it is preferred to use a metal powder, which is pulverized into spherical particles, as the austenitic stainless steel metal powder. As a method of producing an austenitic stainless steel metal powder, the austenitic stainless steel metal powder may be produced by a spraying process of scattering a liquefied (superheated) austenitic stainless steel metal stream into fine droplets, and then cooling the scattered droplets as spherical solid particles having a particle diameter (D50) of 9.5 to 11 μm.

The austenitic stainless steel metal powder, which is composed of the component and the content ratio of Composition 1 or Composition 2 and pulverized into spherical particles having a particle diameter (D50) of 9.5 to 11 μm, is kneaded with a polymer binder including a binding agent, a plasticizer, and a lubricant. In this case, based on the total weight of the composition containing a metal powder, the austenitic stainless steel metal powder and the polymer binder may be included in an amount of 90.0 to 94.0 wt % and 6.0 to 10.0 wt %, respectively. When the content of the austenitic stainless steel metal powder is less than 90.0 wt % based on the total weight of the composition containing a metal powder, a large amount of polymer binder is removed by a degreasing process to be described below, and as a result, a shape of the semi-finished product 40 is not maintained as a three-dimensional shape of a target to be printed, and when the content of the austenitic stainless steel metal powder is more than 94.0 wt %, the polymer binder is added in a small amount, and as a result, it is difficult to secure a cohesive force as a feed material for carrying out three-dimensional printing.

The binding agent is a backbone binder added to secure a cohesive force required during a three-dimensional printing process due to a low binding force between austenitic stainless steel metal powders pulverized into spherical particles, and may include one or more copolymers selected from the group consisting of polystyrene, polyethylene, polypropylene, ethylene-vinylacetate, ethylene-ethylacrylate, methyl-methacrylate, and butyl-methacrylate. In particular, as a binding agent added to the austenitic stainless steel metal powder, a polyethylene copolymer is preferred, and the polyethylene copolymer is removed at high temperature, while a steel product subjected to a hot degreasing process maintains the shape. It is preferred that the polyethylene copolymer is included in an amount of 3 to 5 wt % based on the total weight of the composition containing a metal powder.

The plasticizer is an organic material which is added to a composition agglomerated by a bond between the austenitic stainless steel metal powder and the binding agent to facilitate molding processing during three-dimensional printing, and microcrystalline wax, paraffin wax, montan wax, and the like may be used. In particular, in the present invention, as a plasticizer, paraffin wax, which can enhance ductility by lowering a binding force between the polymer binders even at relatively low temperature, is added. It is preferred that the paraffin wax is included in an amount of 2.5 to 3.5 wt % based on the total weight of the composition containing a metal powder.

The lubricant is a component added to smoothly supply the composition containing a metal powder to the extrusion head 210 of a three-dimensional printer 200 which goes through a supply inducing tube by improving the surface smoothness when the composition containing a metal powder is molten in a raw material supplying machine, and then press-injected, and stearic acid, oleic acid, palmitic acid, linolenic acid, and the like may be used, but in the present invention, stearic acid is added. It is preferred that the stearic acid is included in an amount of 0.5 to 1.5 wt % based on the total weight of the composition containing a metal powder.

After the austenitic stainless steel metal powder having the component and the content ratio of the above-described Composition 1 or Composition 2 and a polymer binder are homogeneously kneaded for 1 hour at a high temperature of 170° C. which is a temperature at which a polyethylene copolymer which is a binding agent included in the polymer binder is completely molten, the kneaded product is cooled to room temperature. The mixture, which is heated, kneaded, and then cooled as described above, is ground by grinder or a pelletizer and pelletized into a pellet having a predetermined particle size, thereby finally producing a composition containing a metal powder.

Hereinafter, a method of producing a steel product by a three-dimensional printing method using the above-described composition containing a metal powder as a raw material will be specifically described.

Figure 2:
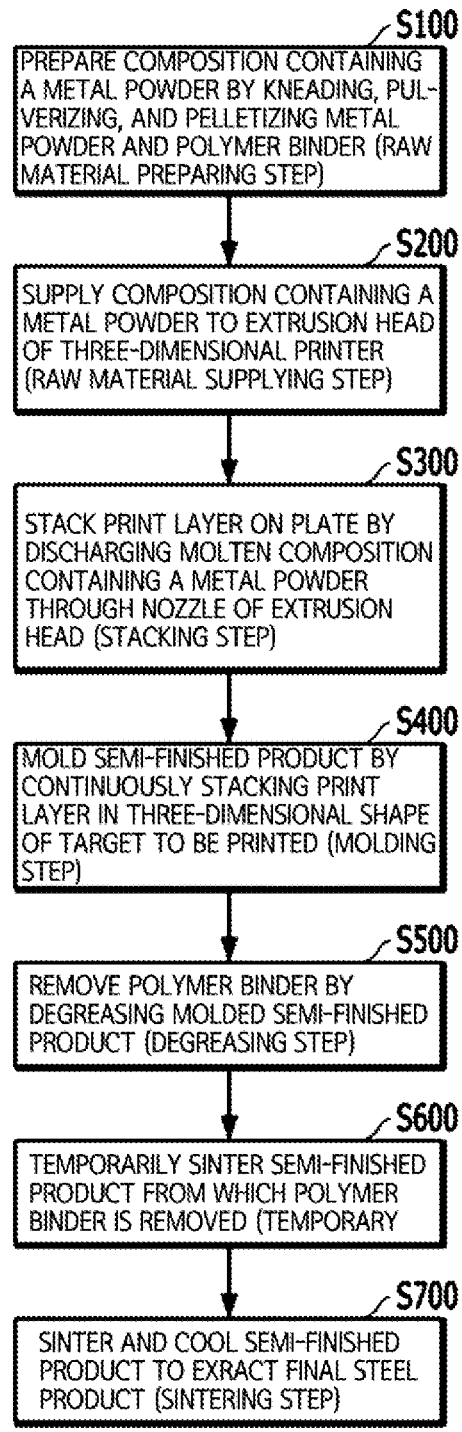
FIG. 2 is a flowchart for explaining a three-dimensional printing method using a composition containing a metal powder according to the present invention as a raw material.

FIG. 2 is a flowchart for explaining a three-dimensional printing method using a composition containing a metal powder according to the present invention as a raw material.

Referring to FIG. 2, the three-dimensional printing method using the composition containing a metal powder according to the present invention as a raw material first prepares a composition containing a metal powder by first kneading a metal powder and a polymer binder, and then pulverizing and pelletizing the kneaded product (a raw material preparing step; S100). In step S100, it is preferred that as the metal powder which is a raw material for the composition containing a metal powder, a SUS-304L or SUS-316L austenitic stainless steel metal powder having the component or the content ratio of the above-described Composition 1 or Composition 2 is used. In the raw material preparing step S100, the metal powder and the polymer binder are homogeneously kneaded, and then the kneaded product is cooled to room temperature. In this case, a kneading process is carried out for 1 hour at a high temperature of 170° C. or more which is a temperature at which a polyethylene copolymer which is a binding agent included in the polymer binder is completely molten for, such that the polyethylene copolymer may be molten and thus homogeneously kneaded with the metal powder. A composition containing a metal powder, which is a feed material in a three-dimensional printing process to be described below, is produced by pulverizing the mixture, which is thus heated and kneaded, and then cooled, using a grinder or a pelletizer, while pelletizing the mixture into a pellet having a predetermined particle size.

Moreover, the composition containing a metal powder prepared in the raw material preparing step S100 is supplied to an extrusion head 310 of a three-dimensional printer 300 (a raw material supplying step; S200). In the raw material supplying step S200, it is preferred that the composition containing a metal powder 30 is molten and press-injected by the raw material supplying machine 200, and is supplied to the extrusion head 310, such that the composition containing a metal powder 30 can be smoothly supplied to the extrusion head 310 of the three-dimensional printer 300. However, in some cases, the raw material supplying step S200 may be configured to melt a composition containing a metal powder pellet by heat generated from the extrusion head 310 itself while directly supplying the extrusion head 310 of the three-dimensional printer 300 with the pellet obtained by pelletizing the composition containing a metal powder without going through the raw material supplying machine 200 which melts and press-injects the pellet.

Next, a print layer is stacked on a base plate 330 by discharging the molten composition containing a metal powder, which is supplied in the raw material supplying step S200 through a nozzle of the extrusion head 310 of the three-dimensional printer 300, onto the plate 330 (a stacking step; S300). The semi-finished product 40 is molded by repeatedly performing the stacking step S300 to continuously stack the print layer so as to have a three-dimensional shape of a target to be printed (a molding step; S400). In the stacking step S300 and the molding step 400, the extrusion head 310 of the three-dimensional printer 300 moves to the X-axis and the Y-axis with respect to the upper surface of the plate 330, and moves to the X-axis and the Y-axis as described above after one print layer is stacked by discharging the molten composition containing a metal powder, and one layer is stacked again to the Z-axis, and the next print layer is stacked, one layer is stacked again to the Z-axis, and the semi-finished product 40 having a stereoscopic three-dimensional shape of a target to be printed is molded by a continuous printing method.

Figure 3:
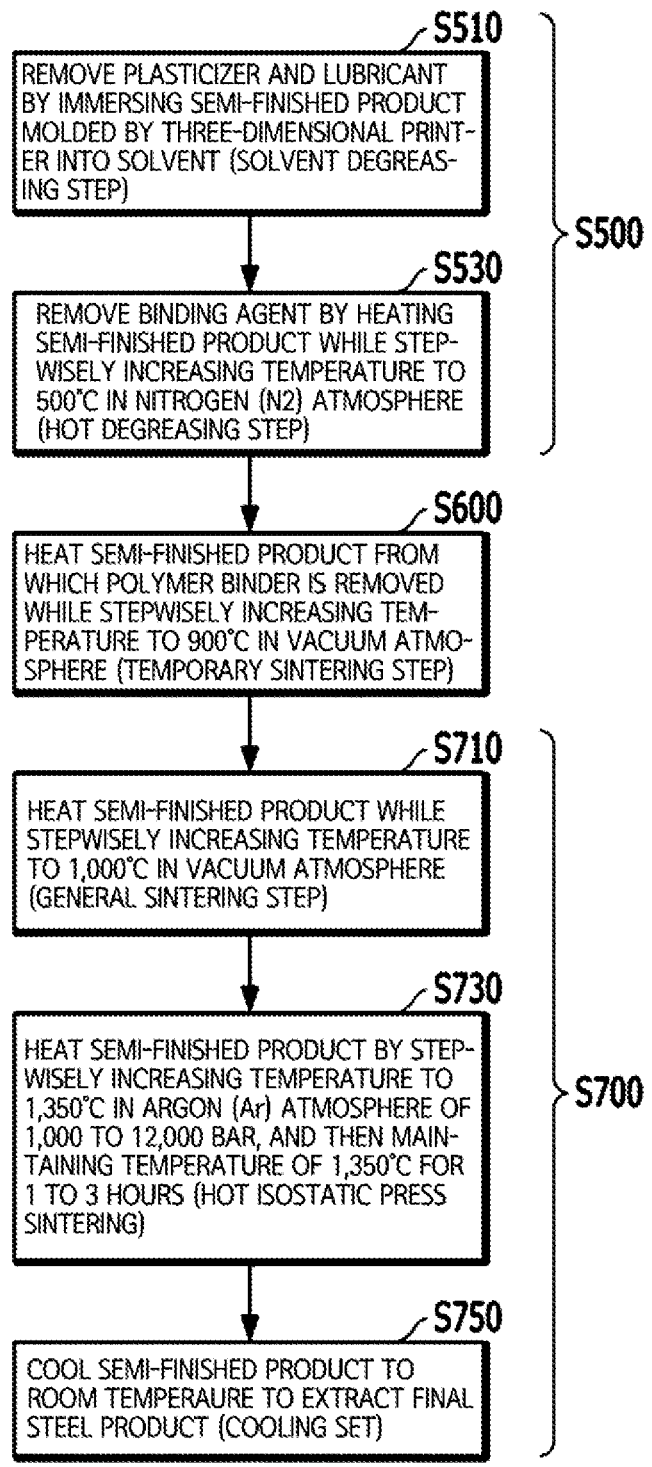
FIG. 3 is a flowchart for more specifically explaining degreasing, temporary sintering, and sintering steps in the three-dimensional printing method using a composition containing a metal powder according to the present invention as a raw material, which is illustrated in FIG. 2.

Moreover, polymer binder components contained in the semi-finished product 40 are removed by transferring the semi-finished product 40 which is completely molded by the three-dimensional printing in the molding step S400, to a degreasing machine 400 and heating the semi-finished product 40 in the degreasing machine 400 (a degreasing step; S500). More specifically, for a degreasing (debinding) process in the degreasing step S500, as illustrated in FIG. 3, a process of removing paraffin wax as a plasticizer and stearic acid as a lubricant, which are included in the polymer binder, by a solvent degreasing method by immersing the semi-finished product 40 molded by the three-dimensional printing into a solvent (a solvent degreasing step; S510) and a process of removing a polyethylene copolymer as a binding agent, which is included in the polymer binder by a hot degreasing method by stepwisely heating the semi-finished product 40 from which the solvent is completely degreased (a hot degreasing step; S530) are stepwisely carried out. First, in the solvent degreasing step S510 corresponding to the dewaxing process, paraffin wax and stearic acid in the polymer binder contained in the semi-finished product 40 are dissolved in a tetrahydrofuran or heptane solvent and primarily removed by immersing the semi-finished product 40, which is completely molded by the three-dimensional printing, into the tetrahydrofuran or heptane solvent. In this case, the solvent degreasing process is performed at a solvent temperature of 25 to 35° C. for 24 hours or more. When the solvent temperature is less than 25° C., cracks easily occur on the semi-finished product 40 as paraffin wax and stearic acid are rapidly removed from the semi-finished product 40. When the solvent temperature is more than 35° C., the rate (removal rate) at which paraffin wax and stearic acid are removed from the semi-finished product 40 for a predetermined time is decreased, so that there occur problems in that as the residual paraffin wax and stearic acid are rapidly removed during a hot degreasing process to be described below, cracks easily occur on the semi-finished product 40, and it takes a long period of time for the solvent degreasing process to be carried out in order to achieve a target removal rate. Furthermore, when the semi-finished product 40 is immersed into a solvent at a temperature of 25 to 35° C. for less than 24 hours, the rate (removal rate) at which paraffin wax and stearic acid are removed is decreased, so that as the residual paraffin wax and stearic acid are rapidly removed during a hot degreasing process, cracks may occur on the semi-finished product 40.

Figure 4:
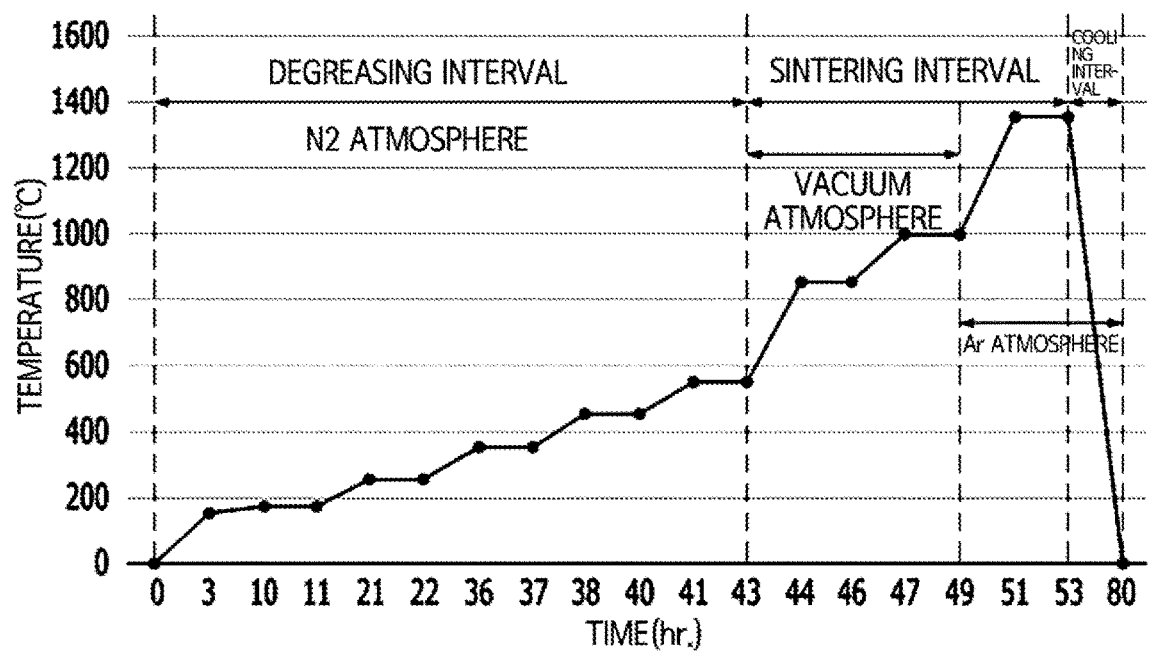
FIG. 4 is a graph illustrating a change in temperature over time at the degreasing, sintering, and cooling intervals of the three-dimensional printing method using a composition containing a metal powder according to the present invention as a raw material.

After the solvent degreasing step S510 is completed, a polyethylene copolymer which is a binding agent component of a polymer binder which is not dissolved in a tetrahydrofuran or heptane solvent is removed by performing the hot degreasing step S530 of heating the semi-finished product 40. In the hot degreasing step S530, the residual paraffin wax and stearic acid, which are not removed in the solvent degreasing step S510 and remain in the semi-finished product 40, are also removed together. In the heating process in the hot degreasing step S530 for removing the polymer binder from the semi-finished product 40, a temperature increase rate is important. Accordingly, as shown in the degreasing interval of the temperature graph over time illustrated in FIG. 4, paraffin wax, stearic acid, and the polyethylene copolymer may be more definitely removed from the semi-finished product 40 by stepwisely increasing the temperature to 500° C., maintaining the temperature increase rate at a low level with respect to the respective temperature intervals where paraffin wax, steric acid, and the polyethylene copolymer are removed, and setting the temperature maintenance time to a long period of time. It is preferred that the total time taken for the hot degreasing step S530 to be carried out is 40 hours or more, and it is preferred that the hot degreasing is performed in a nitrogen (N2) atmosphere in order to maximally prevent the austenitic stainless steel metal contained in the semi-finished product 40 from being oxidized.

In order to carry out a sintering step S700 to be described below, a step (a temporary sintering step; S600) of temporarily sintering the semi-finished product 40 subjected to the degreasing step S500 may be carried out before the semi-finished product 40 is transferred to a sintering furnace 500. In the temporary sintering step S600, the semi-finished product 40 from which the polymer binder is removed is primarily subjected to temporary sintering by being heated while stepwisely increasing the temperature to 900° C. in a vacuum atmosphere. The reason why the temporary sintering step S600 is carried out prior to the full-scale sintering is because the semi-finished product 40 immediately after being subjected to the degreasing step S500 is in an unstable state where the polymer binder is completely removed, so that it is difficult to transfer the semi-finished product 40 to the sintering furnace 500. In the temporary sintering step S600, a subtle volume shrinkage with a shrinkage rate of about 0.5% to about 1.0% occurs in the semi-finished product 40 primarily subjected to temporary sintering as compared to the semi-finished product 40 immediately after being subjected to the degreasing step S500. When the degreasing step S500 and the sintering step S600 are carried out at one place without transferring the semi-finished product 40, the temporary sintering step S600 in which the semi-finished product 40 is primarily subjected to temporary sintering may be omitted.

In the degreasing step S500, the semi-finished product 40 from which the polymer binder is removed is extracted as the final steel product 50 as a sintered body by being subjected to a sintering step in the sintering furnace 500 (a sintering step; S700). In the sintering process, it is possible to use any one sintering method of general sintering, press sintering, and hot isostatic press sintering, or a sintering method in combination thereof. Specifically, in the present invention, the semi-finished product 40 is sintered by sequentially performing the general sintering and the hot isostatic press sintering, as illustrated in FIG. 3. First, on the semi-finished product 40 subjected to the degreasing step S500 or the temporary sintering step S600, the general sintering is performed while stepwisely increasing temperature to 1,000° C. in a vacuum atmosphere and heating the semi-finished product 40 (a general sintering step; S710). After the general sintering is performed until 1,000° C., the hot isostatic press sintering is performed while stepwisely increasing temperature to 1,350° C. in an argon (Ar) atmosphere under a pressure of 1,000 to 1,200 bar and heating the semi-finished product 40 (a hot isostatic press sintering step; S730). In particular, in the hot isostatic press sintering step S730, the sintering process is performed by increasing the temperature to 1,350° C. in an argon (Ar) atmosphere, and then maintaining the temperature at 1,350° C. for 1 to 3 hours. The hot isostatic press sintering step S730 is a process performed to improve physical and mechanical characteristics of the semi-finished product 40, and the homogeneous and highly dense steel product 50 may be obtained by isotropically pressing and heating the semi-finished product 40 by an inert gas such as argon (Ar) in order to prevent chromium (Cr) and nickel (Ni) components included in the austenitic stainless steel of the semi-finished product 40 from being volatilized.

In the hot isostatic press sintering step S730, the semi-finished product 40 completely sintered is cooled to room temperature and thus is extracted as a final steel product 50 (a cooling step; S750). In the cooling step S750, as in the hot isostatic press sintering step S730 previously performed, cooling is performed in an argon (Ar) atmosphere in order to prevent chromium (Cr) and nickel (Ni) components included in the austenitic stainless steel of the semi-finished product 40 from being volatilized.

Hereinafter, a device of producing a steel product by the three-dimensional printing method using the composition containing a metal powder as a raw material will be specifically described.

Figure 5:
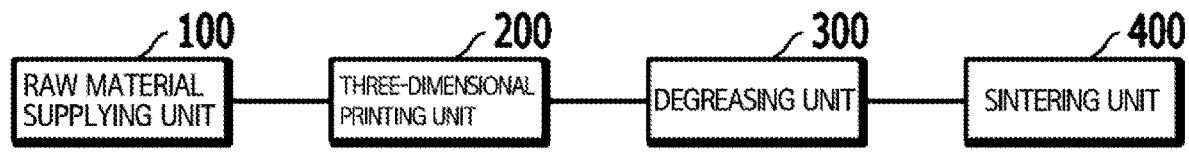
FIG. 5 is a conceptual view for explaining a configuration of a three-dimensional printing device according to the present invention.

FIG. 5 is a conceptual view for explaining the configuration of the three-dimensional printing device according to the present invention.

Referring to the configuration views of the three-dimensional printing device 10 using the metal powder-containing composition according to the present invention, which is illustrated in FIGS. 1 and 5, the three-dimensional printing device 10 using the metal powder-containing composition includes the raw material supplying unit 100 which supplies the extrusion head 210 of the three-dimensional printing unit 200 with the metal powder-containing composition 30 formed by homogeneously mixing the metal powder 20*a* and the polymer binder 20*b* by the kneading machine 500, the three-dimensional printing unit 200 which performs printing in a three-dimensional shape of a target to be printed by using the metal power-containing composition 30 supplied from the raw material supplying unit 100 as a raw material, the degreasing unit 300 which removes binder components from the semi-finished product 40 manufactured by the three-dimensional printing unit 200, and the sintering unit 400 which extracts a finished product by sintering the semi-finished product 40 from which the binder components are removed by the degreasing unit 300.

In the present invention, the polymer binder 20*b* which is kneaded with the metal powder 20*a* to constitute the composition containing a metal powder 30 may include a binding agent, a plasticizer, a lubricant, and a surfactant.

The metal powder 20*a* may correspond to an austenitic stainless steel metal powder having a steel composition of SUS-304L or SUS-316L. In the present invention, the metal powder 20*a* may correspond to an austenitic stainless steel metal powder composed of C: 0.03 wt % or less, Si: 1.0 wt % or less, Mn: 1.0 wt % or less, Cr: 18 to 20 wt %, Ni: 10 to 12 wt %, Mo: 0.2 wt % or less, P: 0.03 wt % or less, S: 0.03 wt % or less, the balance Fe, and other inevitable impurities. In the present invention, the metal powder 20*a* may correspond to an austenitic stainless steel metal powder composed of C: 0.03 wt % or less, Si: 1.0 wt % or less, Mn: 1.5 wt % or less, Cr: 16 to 18 wt %, Ni: 11 to 14 wt %, Mo: 2 to 3 wt %, P: 0.03 wt % or less, S: 0.03 wt % or less, the balance Fe, and other inevitable impurities.

In the present invention, the composition containing a metal powder 30 may be prepared by kneading, pulverizing, and pelletizing 90.0 to 94.0 wt % of the metal powder 20*a*, 3.0 to 5.0 wt % of a binding agent, 2.5 to 3.5 wt % of a plasticizer, and 0.5 to 1.5 wt % of a lubricant. In the present invention, the binding agent may correspond to a polyethylene copolymer, the plasticizer may correspond to paraffin wax, and the lubricant may correspond to stearic acid.

As described above, the three-dimensional printing device 10 according to the present invention includes: the raw material supplying unit 100 which is supplied with the metal powder-containing composition 30 including the polymer binder 20*b* from the outside and injects the supplied metal powder-containing composition 30; the first transfer pipe unit 190 which transfers the metal powder-containing composition 30 injected from the raw material supplying unit 100; the three-dimensional printing unit 200 which molds the semi-finished product 40 by discharging the metal powder-containing composition 30 supplied from the first transfer pipe to continuously stack a print layer in a three-dimensional shape of a target to be printed; the degreasing unit 300 which removes a binder from the semi-finished product 40 molded by the three-dimensional printing unit 200; and the sintering unit 400 which sinters the semi-finished product 40 molded by the three-dimensional printing unit 200.

Figure 6:
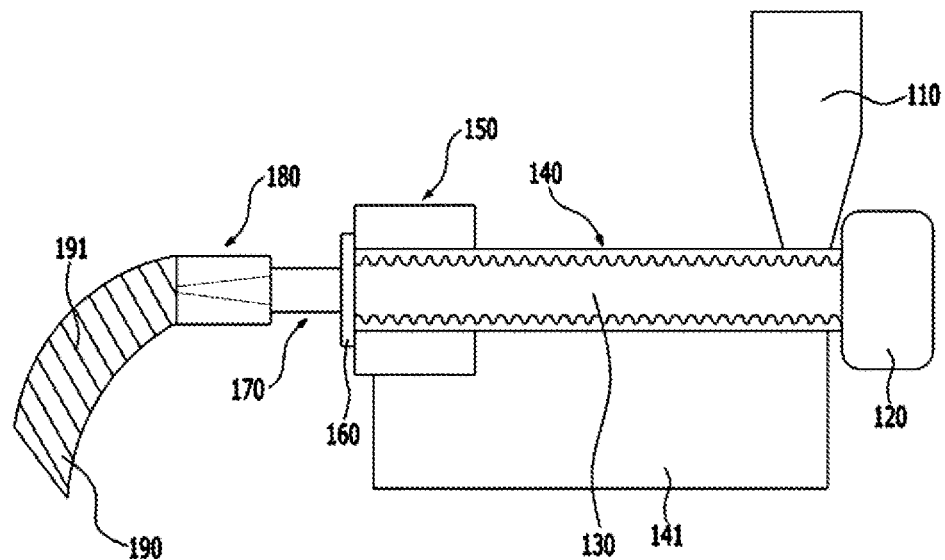
FIG. 6 is a side cross-sectional view of a raw material supplying unit of the three-dimensional printing apparatus according to the present invention.

FIG. 6 is a side cross-sectional view of the raw material supplying unit 100 of the three-dimensional printing device according to the present invention. The raw material supplying unit 100 of the present invention includes: a hopper part 110 which is supplied with the composition containing a metal powder 30 as a raw material from the outside; a barrel part 140 which is provided with a transfer passage connected to the hopper part 110; an injection means 130 which is positioned inside the barrel part 140 and injects the composition containing a metal powder 30 inside the barrel part 140; a heating part 150 which heats the composition containing a metal powder 30 inside the barrel part 140; a die part 180 which connects the barrel part 140 to the first transfer pipe 190; a feed pipe part 170 which connects the barrel part 140 to the die part 180; a driving part 120 which drives the injection means 130; and a supporting part 141 which supports the barrel part 140, and the like.

Preferably, the injection means 130 is a screw part and the driving part 120 is an apparatus which provides power such that the screw part makes a rotational movement and/or a linear movement, and preferably, it is preferred that the driving part 120 is a driving motor which can move leftward or rightward or a driving motor of which the rotor part can move leftward or rightward. Alternatively, the injection means 130 may also be in the form of a piston.

It is preferred that the composition containing a metal powder 30 is supplied to the raw material supplying unit 100 in the form of a pellet in which the metal powder 20*a* and the polymer binder 20*b* are kneaded, and the binder 20*b* includes a binding agent, a plasticizer, a lubricant, and a surfactant. The composition containing a metal powder 30 in the form of a pellet, which is a kneaded body of the metal powder 20*a* and the polymer binder 20*b* as described above, is introduced into the barrel part 140 through the hopper part 110, and is transferred to the first transfer pipe unit 190 through the feed pipe part 170 and the die part 180 by the injection means 130 or the screw part while being heated inside the barrel part 140.

Preferably, it is preferred that the die part 180 has a passage in a form in which an inner diameter is decreased from the side of the feed pipe part 170.

Meanwhile, the composition containing a metal powder 30 injected from the barrel part 140 of the raw material supplying unit 100 as described above is transferred through the first transfer pipe unit 190. The first transfer pipe unit 190 is provided with a heating coil part 191 which heats a material moving inside the first transfer pipe unit 190, so that the injected composition containing a metal powder 30 may be maintained in an optimal state until the injected metal powder-containing composition 30 is discharged from a three-dimensional printing unit 200 without being cured during the transfer. Preferably, a module which sets the temperature and implements a feedback control may also be additionally provided for measuring the temperature of the heating coil part 191, and adjusting the temperature of the composition containing a metal powder 30 inside the first transfer pipe unit 190 within a temperature range, which is pre-set according to the composition containing a metal powder 30, based on a measured temperature value.

Figure 7:
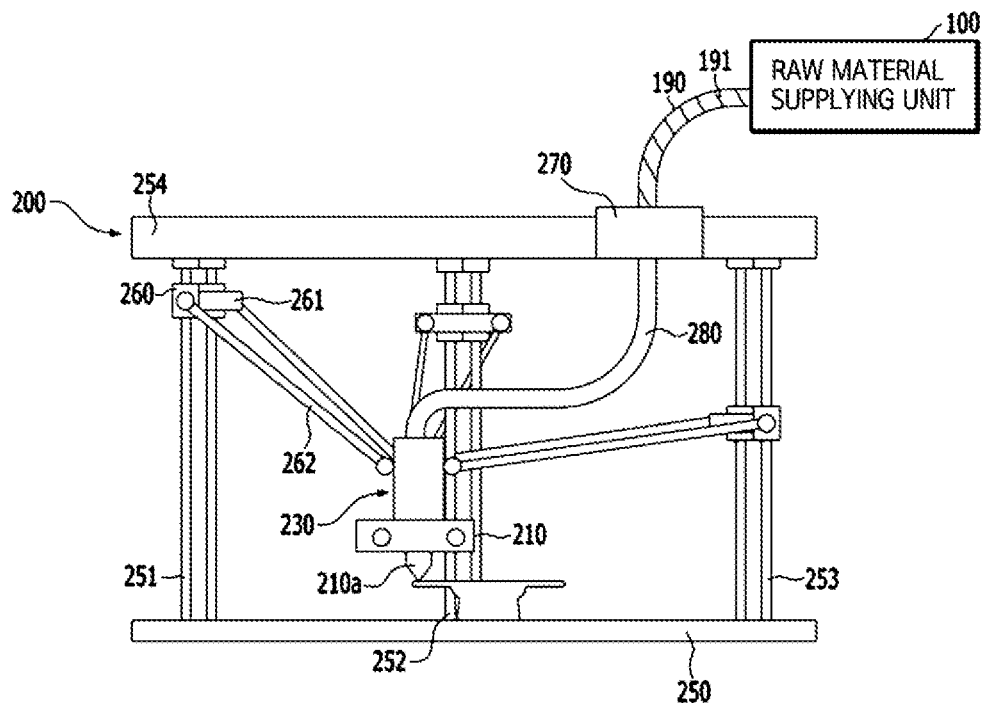
FIG. 7 is a view for explaining an Example of a three-dimensional printing unit of the three-dimensional printing device according to the present invention.

Meanwhile, FIG. 7 is a view for explaining an Example of the three-dimensional printing unit 200 of the three-dimensional printing device according to the present invention. As illustrated in FIG. 3, the three-dimensional printing unit 200 includes: a first axis guide 251, a second axis guide 252, and a third axis guide 253; a plurality of carriages 260 which is capable of moving along an axis in the first axis guide 251, the second axis guide 252, and the third axis guide 253; a plurality of support axes 262 which are connected to the carriages 260; a moving part 230 which is connected to the plurality of support axes 262; the extrusion head 210 which is fixed to the moving part 230 to extrude the supplied composition containing a metal powder 30; and a nozzle 210a which discharges the extruded composition containing a metal powder 30.

Specifically, for the apparatuses, the first axis guide 251, the second axis guide 252, and the third axis guide 253 are vertically supported on the base plate 250, and an upper plate 254 which supports the guides is provided on the upper side of the first axis guide 251, the second axis guide 252, and the third axis guide 253.

The carriage 260, which is capable of making a linear movement along the guide, is provided at each of the first axis guide 251, the second axis guide 252, and the third axis guide 253, and the carriage 260 is connected to each of the support axes 262 through a connection part 261. Preferably, each step motor is embedded in the connection part 261, and each step motor receives a position value transferred from a control unit (not illustrated) of a computing apparatus, and moves the carriages 260 rectilinearly and vertically, such that each carriage 260 is positioned at a target vertical position.

Further, the support axis 262 may make a hinge movement with respect to the carriage 260, and the support axis 262 may make a hinge movement with respect to the moving part 230. By the three carriages 260 which may move to the three axes and the support axis 262 which may make a rotational movement, preferably, a hinge movement by the carriages as described above, the moving part 230 connected such that the support axis 262 may make a hinge movement may move to a three-dimensional position designated by the computing apparatus.

The extrusion head 210 and the nozzle 210a are coupled to the moving part 230 as described above, and the composition containing a metal powder 30 in a semi-fluid state may be injected and discharged by the nozzle 210a.

Meanwhile, the first transfer pipe unit 190 is connected to a second transfer pipe unit 280 through a pipe connection part 261 provided on the upper plate 254. A heat source apparatus, which enables maintaining the semi-fluid state of the composition containing a metal powder 30, may also be provided at the second transfer pipe unit 280.

Figure 8:
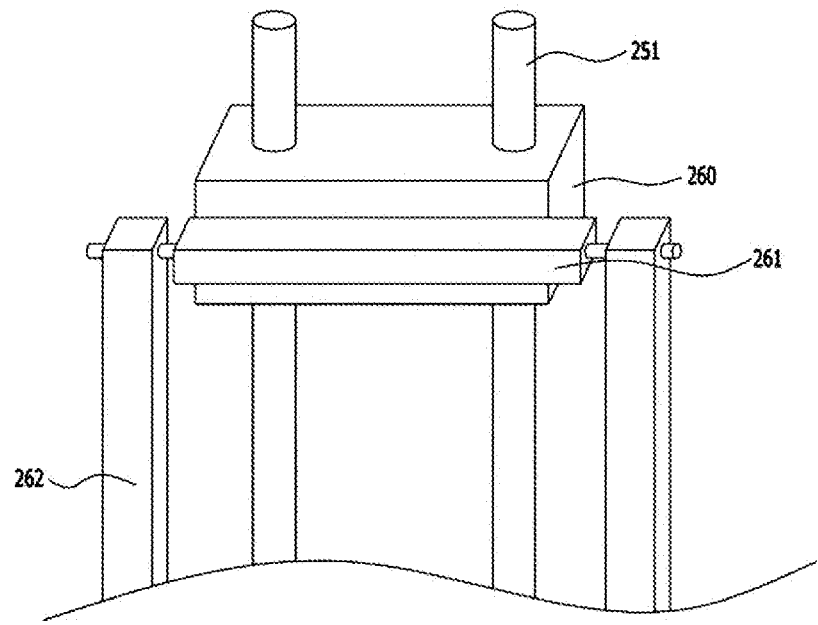
FIG. 8 is a view for explaining a first Example of a configuration of driving a moving part of the three-dimensional printing unit of the three-dimensional printing device according to the present invention.

FIG. 8 is a view for explaining a first Example of a configuration of driving the moving part 230 of the three-dimensional printing unit 200 of the three-dimensional printing device according to the present invention.

FIG. 8 illustrates constituent elements connected to the first axis guide 251 in detail. The second axis guide 252 and the third axis guide 253 may be configured to be similar to the first axis guide 251.

As illustrated in FIG. 8, the first axis guide 251 may have two or more rods. The carriage 260 can move reciprocally and vertically along the first axis guide 251, and the movement of the carriage as described above is driven by a driving means embedded in the connection part 261.

Meanwhile, the support axis 262 has two or more rods in a form capable of making a hinge movement with respect to the connection part 261 or the carriage 260.

Figure 9:
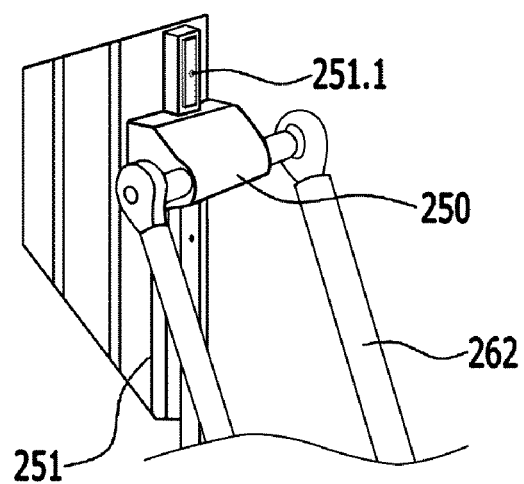
FIG. 9 is a view for explaining a second Example of the configuration of driving the moving part of the three-dimensional printing unit of the three-dimensional printing device according to the present invention.

FIG. 9 is a view for explaining a second Example of a configuration of driving the moving part 230 of the three-dimensional printing unit 200 of the three-dimensional printing device according to the present invention.

FIG. 9 illustrates constituent elements connected to the first axis guide 251 in detail. The second axis guide 252 and the third axis guide 253 may be configured to be similar to the first axis guide 251.

As illustrated in FIG. 9, a guide protrusion part 251.1 may be provided at the first axis guide 251, and the carriage 260 is formed with a groove in a form capable of being engaged with the guide protrusion part 251.1. In the second Example, a step motor is provided inside the carriage 260, and the carriage 260 is in the form capable of moving reciprocally along the guide protrusion part 251.1.

The configuration described above may enable a 3-axis control in a more simplified form than the first Example.

Figure 10:
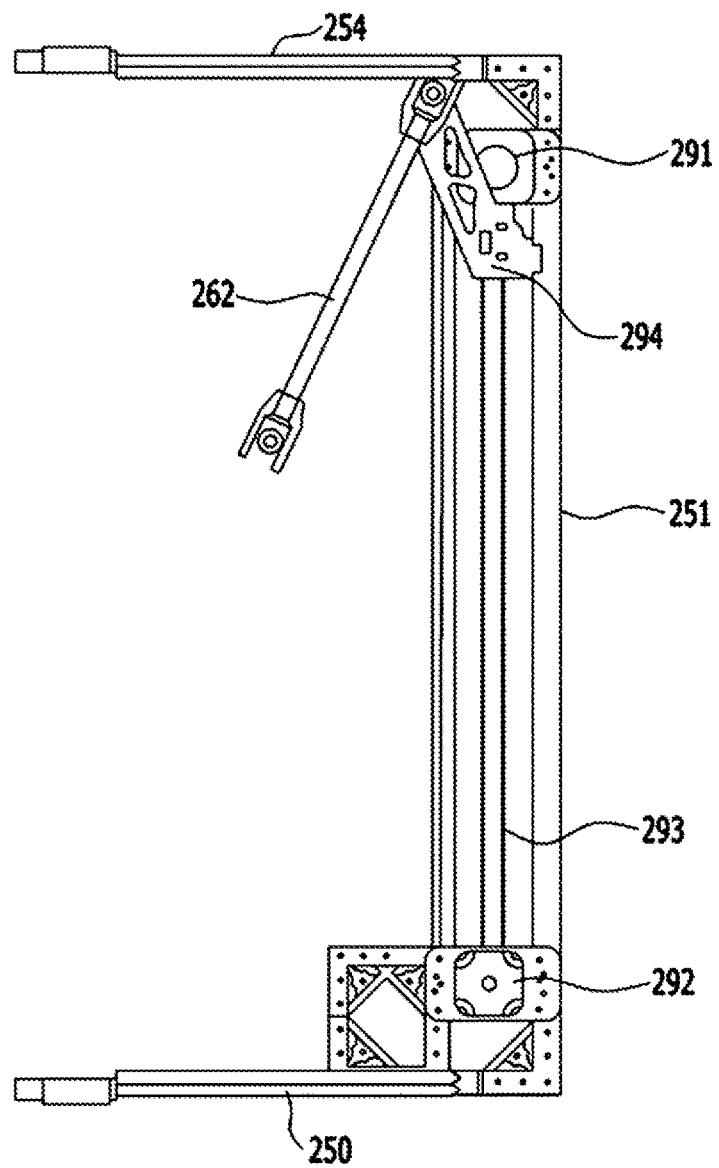
FIG. 10 is a view for explaining a third Example of the configuration of driving the moving part of the three-dimensional printing unit of the three-dimensional printing device according to the present invention.

FIG. 10 is a view for explaining a third Example of a configuration of driving the moving part 230 of the three-dimensional printing unit 200 of the three-dimensional printing device according to the present invention.

FIG. 10 illustrates constituent elements connected to the first axis guide 251 in detail. The second axis guide 252 and the third axis guide 253 may be configured to be similar to the first axis guide 251.

As illustrated in FIG. 10, a step motor part 291 is provided at the upper side of the first axis guide 251, a belt pulley part 292 is provided at the lower side thereof, and a belt 293 capable of making a conveyor movement by the step motor part 291 is supported by the belt pulley part 292. In the configuration described above, a carriage part 294 fixed to the belt 293 may move vertically and reciprocally by driving the step motor part 291, and accordingly, a support axis 262 capable of making a hinge movement moves to the carriage part 294.

Figure 11:
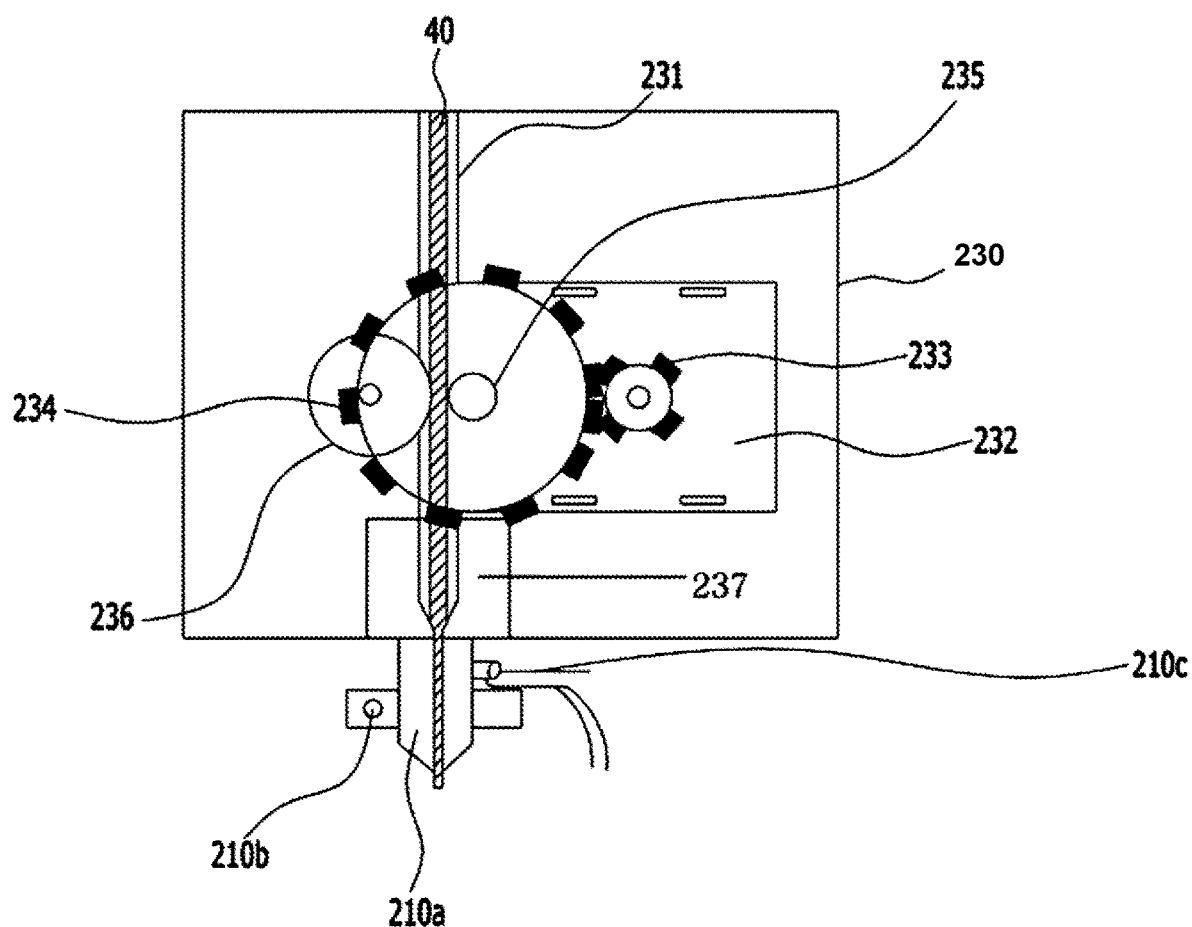
FIG. 11 is a view for explaining a detailed configuration of an extrusion head and the moving part of the three-dimensional printing device according to the present invention.

FIG. 11 is a view for explaining detailed configurations of the extrusion head 210 and the moving part 230 of the three-dimensional printing device according to the present invention. The detailed configuration to be explained below may be disposed inside the extrusion head 210, except for the configuration associated with the nozzle.

As described above, the three-dimensional printing unit 200 molds the semi-finished product 40 by discharging the composition containing a metal powder 30 supplied from the first transfer pipe unit 190 to continuously stack a print layer in a three-dimensional shape of a target to be printed.

Preferably, it is preferred that the discharge is in the form of extrusion, and hereinafter, the internal configurations of the moving part 230, the extrusion head 210, and the nozzle 210a for implementing the extrusion form described above will be described.

In the present invention, the three-dimensional printing unit 200 includes: an extruder step motor 232; a first gear part 233 which is connected to a rotation axis of the extruder step motor 232; a second gear part 234 which is engaged with the first gear part 233, has a larger diameter than that of the first gear part 233, and has a rotation center with an extrusion roller 235; an extrusion bearing 236 which rotates while supporting the composition containing a metal powder 30 at a side opposite to the second gear part 234 during a rotation of the second gear part 234; and an extrusion feeding part 237 which transfers the composition containing a metal powder 30, which is extruded by the extrusion roller 235 and the extrusion bearing 236, to the side of the nozzle 210a.

A moving passage 231, which is disposed inside the moving part 230 and the extrusion head 210 and through which the composition containing a metal powder 30 moves, is formed inside the moving part 230 and the extrusion head 210, and is connected to an external second transfer pipe unit 280.

In the configuration described above, when the extruder step motor 232 is rotated, the extrusion roller 235 is rotated as a result, and by rotation of the extrusion roller 235, the composition containing a metal powder 30 inside the moving passage 231 is extruded to be extruded to the outside through the extrusion feeding part 237 and the nozzle 210a.

The three-dimensional printing unit 200 further includes: a nozzle temperature measuring part 210c which measures the temperature of the nozzle 210a; and a nozzle heater 210b which heats the nozzle 210a based on a temperature value measured by the nozzle temperature measuring part 210c. Through the adjustment of the temperature of the composition containing a metal powder 30 at the end side as described above, the composition containing a metal powder 30 may be discharged to the outside within an optimal temperature range, and accordingly, in the present invention including the metal powder 20a and the polymer binder 20b, excellent durability of a product may be secured.

Figure 12:
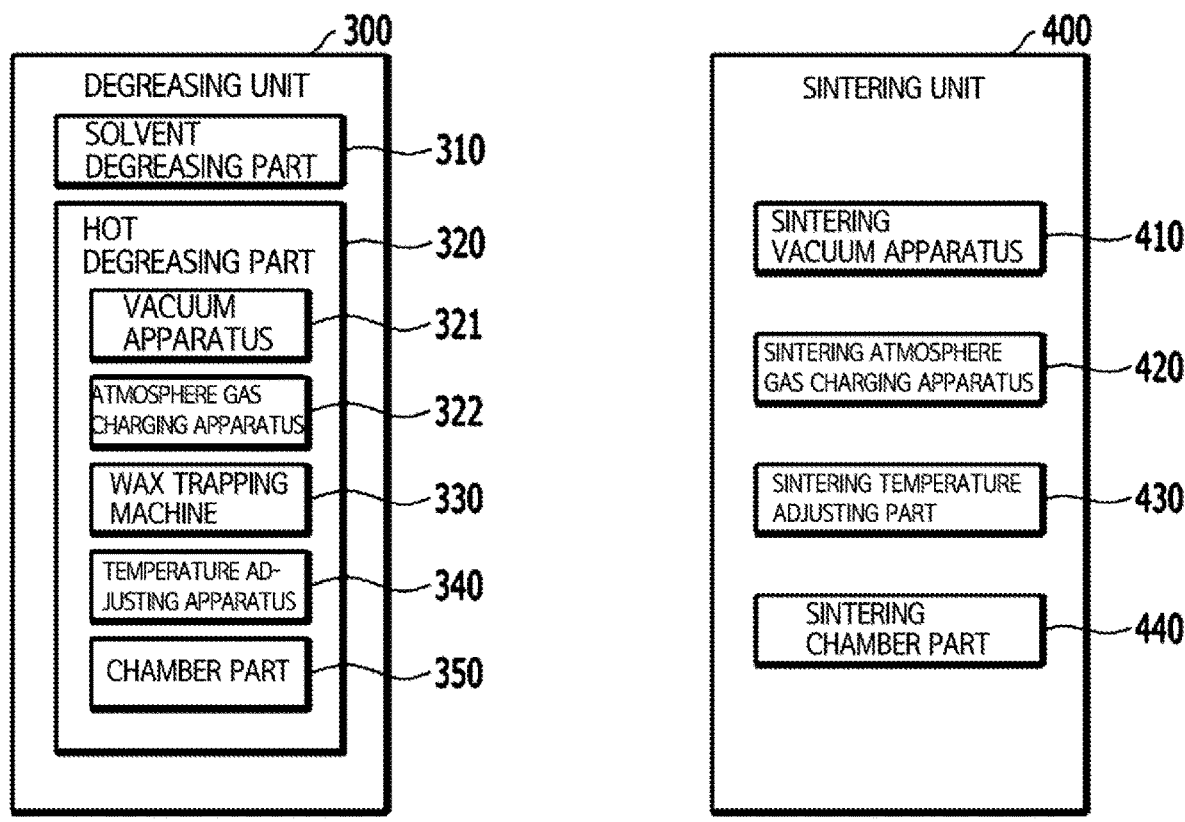
FIG. 12 is a view for explaining a degreasing unit and a sintering unit of the three-dimensional printing device according to the present invention.

Meanwhile, FIG. 12 is a view for explaining the degreasing unit 300 and the sintering unit 400 of the three-dimensional printing device 10 according to the present invention. As illustrated in FIG. 12, the degreasing unit 300 includes a solvent degreasing unit 300 which extracts the binder 20b from the semi-finished product 40.

The solvent degreasing unit 300 is a device which extracts a binder material mixed with the semi-finished product 40 formed by the three-dimensional printing unit 200, for example, paraffin wax and SA binder.

Meanwhile, the degreasing unit 300 further includes a hot degreasing unit 300 which carries out degreasing in a vacuum or inert gas atmosphere, and the hot degreasing unit 300 includes: a chamber part 350; a vacuum apparatus 321 which decreases pressure in the chamber part 350; an atmosphere gas charging apparatus 322 which charges an atmosphere gas into the chamber part; and a temperature adjusting part 340 which adjusts the temperature of the chamber part.

The vacuum apparatus 321 is a device capable of maintaining the pressure at a high vacuum of up to $10^{-4}$ torr in an initial air atmosphere in order to create a reducing atmosphere inside the chamber part 350, and the vacuum apparatus 321 described above includes a diffusion pump and/or a rotary vacuum pump.

Meanwhile, the atmosphere gas charging apparatus 322 is a device which charges a carrier gas that creates an atmosphere inside the chamber part 350.

Meanwhile, preferably, the hot degreasing part 300 may further include a wax trapping machine 330 which is a cooling trap capturing an organic binder in a gas state in order to prevent the organic binder, which is debinded at the degreasing interval, from entering the vacuum pump or the other auxiliary apparatuses to cause failure.

Further, the hot degreasing part 300 includes the temperature adjusting part 340 for allowing the chamber part 350 to be in a heated state or a cooled state by adjusting the temperature of the chamber part 350.

Meanwhile, the sintering unit 400 includes: a sintering chamber part 440; a sintering vacuum apparatus 410 which decreases pressure in the sintering chamber part 440; a sintering atmosphere gas charging apparatus 420 which charges an atmosphere gas into the sintering chamber part 440; and a sintering temperature adjusting part 430 which adjusts the temperature of the sintering chamber part 440.

Likewise, the sintering vacuum apparatus 410 is a device capable of maintaining the pressure at a high vacuum of up to $10^{-4}$ torr in an initial air atmosphere in order to create a reducing atmosphere inside the sintering chamber part 440, and the vacuum apparatus described above includes a diffusion pump and/or a rotary vacuum pump.

Meanwhile, the sintering atmosphere gas charging apparatus 420 is an apparatus which charges a carrier gas that creates an atmosphere inside the sintering chamber part 440.

Further, the sintering unit 400 includes the sintering temperature adjusting part 430 for allowing the chamber part to be in a heated state or a cooled state by adjusting the temperature of the sintering chamber part 440.

In the present invention, an apparatus in which the hot degreasing part 300 and the sintering unit 400 are integrally formed may also be used. In this case, for example, degreasing is performed by the hot degreasing part 300, and then sintering may also be performed by a value set by another work.

A three-dimensional printing device according to another Example of the present invention will be described. The raw material supplying unit 100 constituting the three-dimensional printing device 10 of the present invention supplies the three-dimensional printing unit 200 with the composition containing a metal powder 30 in which the metal power 20a and the binder 20b are homogeneously mixed. In the present invention, the heating coil part 191 may be wound on the external surface of the first transfer pipe unit 190, which is connected to the raw material supplying unit 100, such that the composition containing a metal powder 30 in a molten state may be smoothly supplied to the extrusion head 210 of the three-dimensional printing unit 200. Meanwhile, the three-dimensional printing unit 200 constituting the three-dimensional printing device includes the extrusion head 210 which is supplied with the composition containing a metal powder 30 from the raw material supplying unit 100 and discharges the composition containing a metal powder 30, the moving part 230 which has one side mounted with the extrusion head 210 and is controlled by an external control system (not illustrated) to move in the X/Y/Z directions at an upper portion of the base plate 250, and the base plate 250 on which the composition containing a metal powder 30 discharged from the extrusion head 210 is stacked. In the present invention, the extrusion head 210 molds the semi-finished product 40 by discharging the composition containing a metal powder 30 onto the surface of the base plate 250 through the nozzle 210a to continuously stack a print layer in a three-dimensional shape of a target to be printed.

Meanwhile, the raw material supplying unit 100 of the three-dimensional printing device may include the heating part 150 which stores the composition containing a metal powder 30 introduced from the outside and heats and melts the composition containing a metal powder 30, and an injection means which presses and injects the composition containing a metal powder 30 molten by the heating part 150. In the present invention, the injection means may be configured as an air compressor to inject the composition containing a metal powder 30 of the barrel part 140 using air pressure by an external control.

Preferably, as illustrated in FIG. 6, the injection means may be configured in the form of an extruder having a method in which as the injection means in a screw method in which a screw thread is formed on the circumference surface rotates by a rotational force transferred from the driving part 120, the composition containing a metal powder 30 heated and stored in the raw material supplying unit 100 and is injected into the extrusion head 210.

Further, in some cases, the raw material supplying unit 100 of the three-dimensional printing device 10 may be configured in a form in which the composition containing a metal powder 30, which is introduced in the form of a pellet in which the metal powder 20a and the binder 20b are kneaded, is introduced into the side of the extrusion head 210 by rotation of the injection means.

The three-dimensional printing unit 200 carries out printing in a three-dimensional shape of a target to be printed by using the composition containing a metal powder 30, which is supplied from the raw material supplying unit 100, as a raw material. More specifically, when the operation of the three-dimensional printing unit 200 is examined, in the case where the composition containing a metal powder 30 supplied from the raw material supplying unit 100 is supplied to the extrusion head 210, the moving part 230 is controlled by an external control system (not illustrated) to move in the X/Y/Z directions at an upper portion of the base plate 250, and the extrusion head 210 mounted at one side of the moving part 230 molds the semi-finished product 40 by discharging the composition containing a metal powder 30 onto the surface of the base plate 250 through the nozzle 210a to continuously stack a print layer on the base plate 250.

The degreasing unit 300 removes the binder 20b from the semi-finished product 40 manufactured by the three-dimensional printing unit 200. In the present invention, the degreasing unit 300 may remove binder components from the semi-finished product 40 by any one degreasing method of solvent degreasing, hot degreasing, or catalyst degreasing, or a degreasing method in combination thereof.

The sintering unit 400 sinters the semi-finished product 40, from which binder components are removed by the degreasing unit 300, to extract the finished product 50 which is a final product. In the present invention, the sintering unit 400 may sinter the semi-finished product 40, from which binder components are removed, by any one sintering method of general sintering, press sintering, and hot isostatic press sintering, or a sintering method in combination thereof to extract the finished product 50.

Figure 13:
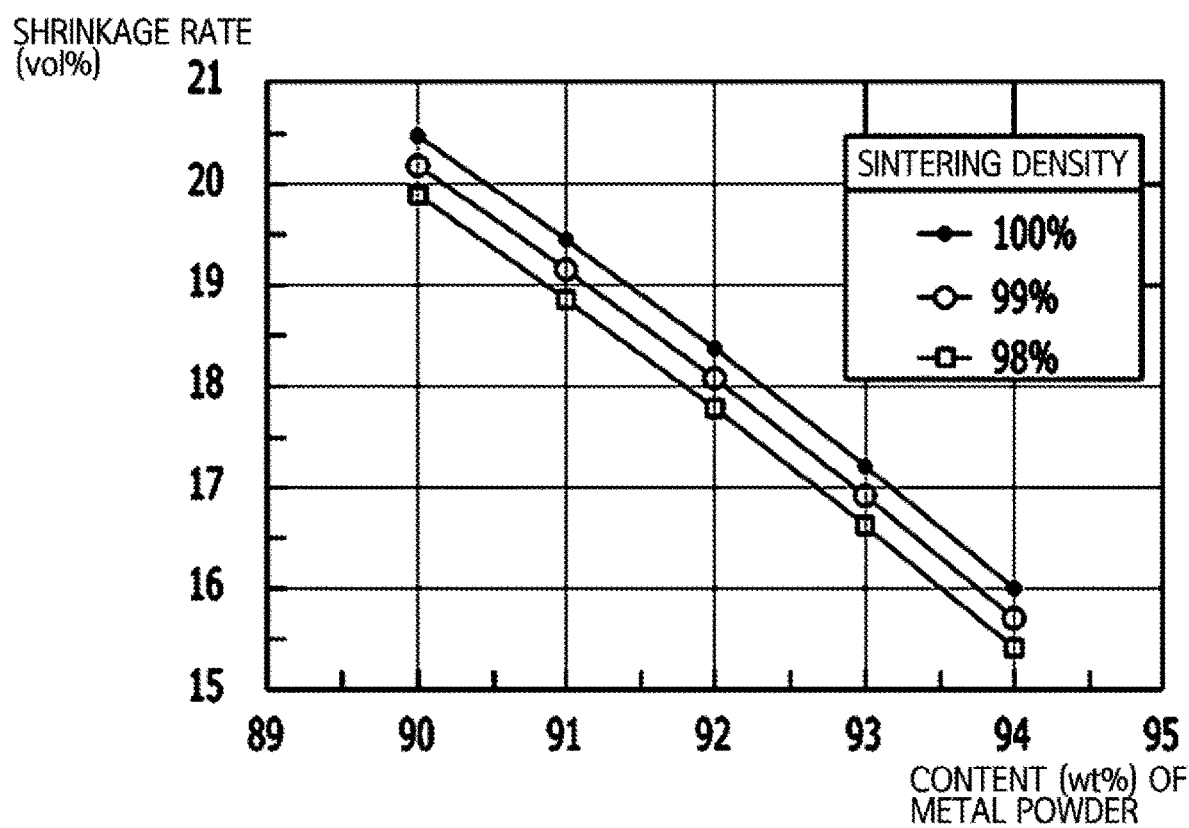
FIG. 13 is a graph obtained by comparing degrees of shrinkage before and after the sintering of a three-dimensional printing product according to the content of metal powder.

When the austenitic stainless steel metal powder according to Composition 1 (SUS-304L) or Composition 2 (SUS-316L) is contained in an amount of 90.0 to 94.0 wt % based on the total weight of the composition containing a metal powder, the shrinkage rate of the steel product 50 extracted after the sintering/cooling process is completed as compared to the semi-finished product 40 molded immediately after the three-dimensional printing process according to the present invention is illustrated in FIG. 13. Referring to FIG. 13, when the austenitic stainless steel metal powder according to Composition 1 (SUS-304L) or Composition 2 (SUS-316L) is contained in an amount of 90.0 wt % based on the total weight of the composition containing a metal powder, a shrinkage rate of about 20% to about 20.5% is shown, and when the austenitic stainless steel metal powder according to Composition 1 (SUS-304L) or Composition 2 (SUS-316L) is contained in an amount of 94.0 wt % based on the total weight of the composition containing a metal powder, a shrinkage rate of about 15.5 wt % to about 16 wt % is shown. At an interval where the content of the austenitic stainless steel metal powder according to Composition 1 (SUS-304L) or Composition 2 (SUS-316L) is contained in an amount of 90.0 to 94.0 wt % based on the total weight of the composition containing a metal powder, it can be confirmed that as the metal powder content is increased, the shrinkage rate is linearly decreased.

As described above, optimal Examples are disclosed in the drawings and the specification. The present invention is limited to the aforementioned Examples, various alterations and modifications are possible within a range not departing from the spirit of the present invention by a person with ordinary skill in the art to which the instant invention pertains, and the true technical protection scope of the present invention will be defined by the technical spirit of the appended claims.

The invention claimed is:

1. A three-dimensional printing device comprising:
   a raw material supplying unit which is supplied with a kneaded and pelletized composition comprising 90.0 to 94.0 wt % of a metal powder and a binder comprising 3.0 to 5.0 wt % of a binding agent, 2.5 to 3.5 wt % of a plasticizer and 0.5 to 1.5 wt % of a lubricant, the composition injected within the raw material supplying unit;
   a first transfer pipe unit which transfers the composition containing a metal powder injected from the raw material supplying unit;
   a three-dimensional printing unit which molds a semi-finished product by discharging the composition containing a metal powder supplied from the first transfer pipe to continuously stack a print layer in a three-dimensional shape of a target to be printed;
   a degreasing unit which removes a binder from the semi-finished product molded by the three-dimensional printing unit; and
   a sintering unit which sinters the semi-finished product molded by the three-dimensional printing unit;
   wherein the three-dimensional printing unit comprises:
   an extruder step motor;
   a first gear part which is connected to a rotation axis of the extruder step motor;
   a second gear part which is engaged with the first gear part, has a larger diameter than that of the first gear part, and has a rotation center provided with an extrusion roller;
   an extrusion bearing which rotates while supporting the composition containing a metal powder at a side opposite to the second gear part during rotation of the second gear part; and
   an extrusion feeding part which transfers the composition containing a metal powder, which is extruded by the extrusion roller and the extrusion bearing, to a side of a nozzle.

2. The three-dimensional printing device of claim 1, wherein the raw material supplying unit comprises:
   a hopper part which is supplied with the composition containing a metal powder from the outside;
   a barrel part which is provided with a transfer passage connected to the hopper part;
   an injection means which is positioned inside the barrel part and injects the composition containing a metal powder inside the barrel part;
   a heating part which heats the composition containing a metal powder inside the barrel part; and
   a die part which connects the barrel part to the first transfer pipe.

3. The three-dimensional printing device of claim 1, wherein the first transfer pipe unit is provided with a heating coil part which heats the composition containing a metal powder moving inside the first transfer pipe unit.

4. The three-dimensional printing device of claim 1, wherein the three-dimensional printing unit comprises:
   a first axis guide, a second axis guide, and a third axis guide;
   a plurality of carriages which is capable of moving along an axis in the first axis guide, the second axis guide, and the third axis guide;

a plurality of support axes which is connected to the carriages;

a moving part which is connected to the plurality of support axes;

an extrusion head which is fixed to the moving part to extrude the supplied composition containing a metal powder; and a nozzle which discharges the extruded composition containing a metal powder.

5. The three-dimensional printing device of claim 1, wherein the three-dimensional printing unit comprises:

a first axis guide, a second axis guide, and a third axis guide;

a plurality of belts which is fixed to each of the first axis guide, the second axis guide, and the third axis guide and in parallel with the first axis guide, the second axis guide, and the third axis guide;

a plurality of carriage parts which is capable of moving along the plurality of belts;

a plurality of support axes which is connected to the carriages;

a moving part which is connected to the plurality of support axes;

an extrusion head which is fixed to the moving part to extrude the supplied composition containing a metal powder; and a nozzle which discharges the extruded composition containing a metal powder.

6. The three-dimensional printing device of claim 4 or 5, wherein the support axis is capable of making a hinge movement with respect to the carriage, and the support axis is capable of making a hinge movement with respect to the moving part.

7. The three-dimensional printing device of claim 1, wherein the degreasing unit comprises a solvent degreasing unit which extracts a binder from the semi-finished product.

8. The three-dimensional printing device of claim 7, wherein the degreasing unit further comprises a hot degreasing part which carries out degreasing in a vacuum or inert gas atmosphere, and the hot degreasing part comprises: a chamber part; a vacuum apparatus which decreases pressure in the chamber part; an atmosphere gas charging apparatus which charges an atmosphere gas into the chamber part; and a temperature adjusting part which adjusts the temperature of the chamber part.

9. The three-dimensional printing device of claim 1, wherein the sintering unit comprises: a sintering chamber part; a sintering vacuum apparatus which decreases pressure in the sintering chamber part; a sintering atmosphere gas charging apparatus which charges an atmosphere gas into the sintering chamber part; and a sintering temperature adjusting part which adjusts the temperature of the sintering chamber part.

10. The three-dimensional printing device of claim 1, wherein the three-dimensional printing unit further comprises:

a nozzle temperature measuring part which measures the temperature of the nozzle; and a nozzle heater which heats the nozzle based on a temperature value measured by the nozzle temperature measuring part.

* * * * *